Figure 7:
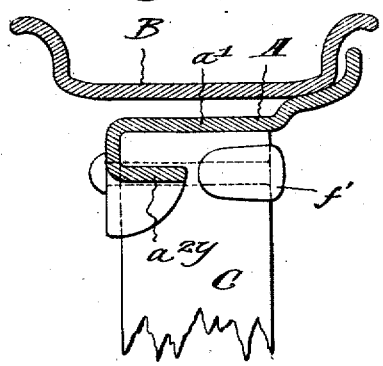

E. K. BAKER.
SEMIWOOD WHEEL.
APPLICATION FILED MAY 13, 1918.
1,321,001.
Patented Nov. 4, 1919.
3 SHEETS—SHEET 1.
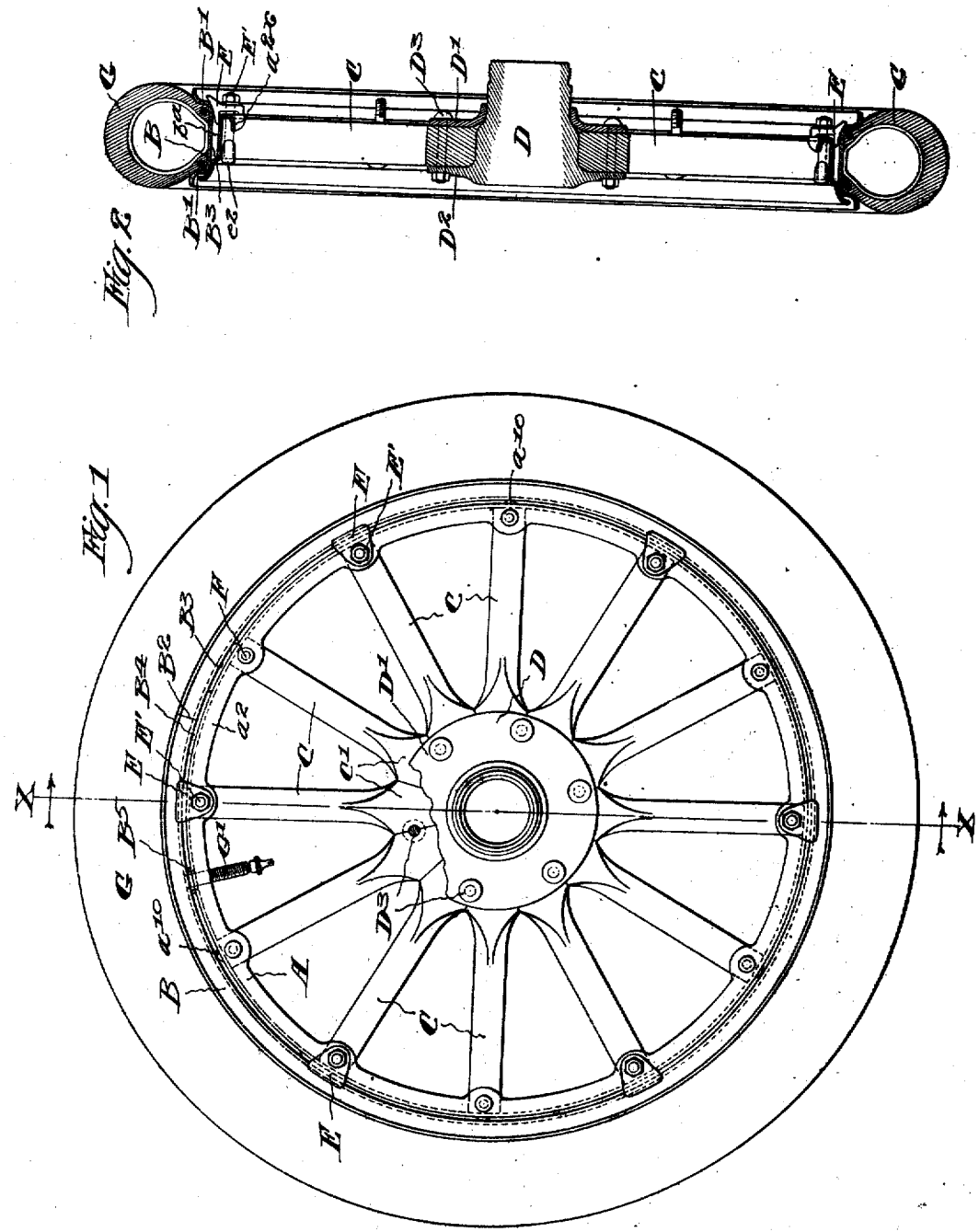

E. K. BAKER.
SEMIWOOD WHEEL.
APPLICATION FILED MAY 13, 1918.
1,321,001.
Patented Nov. 4, 1919.
3 SHEETS—SHEET 2.
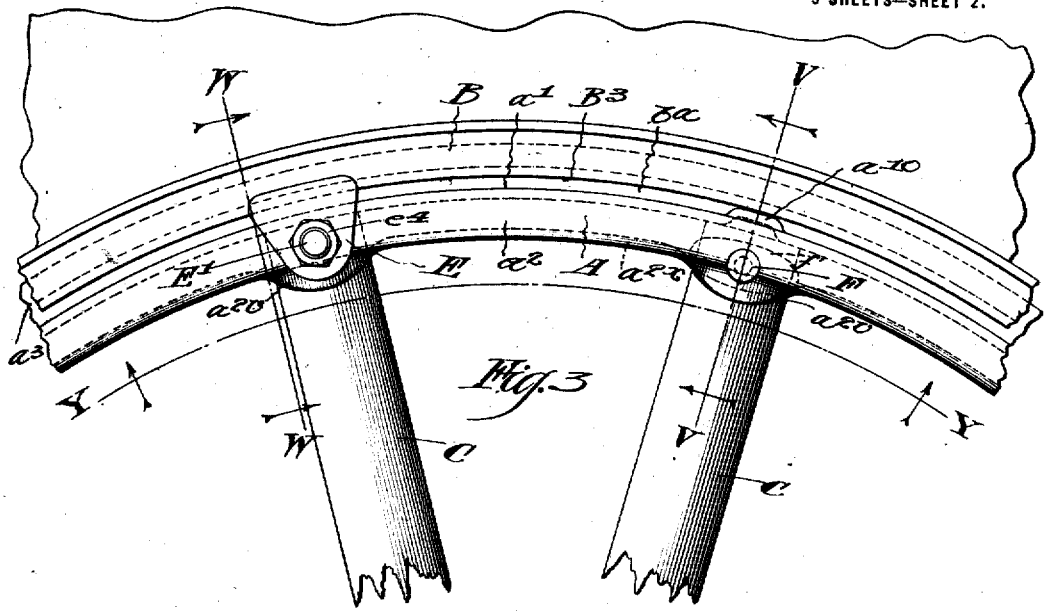
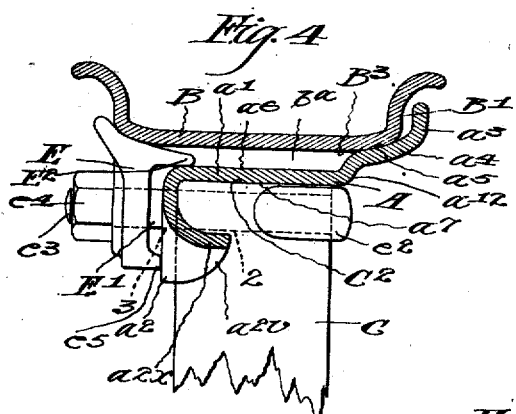
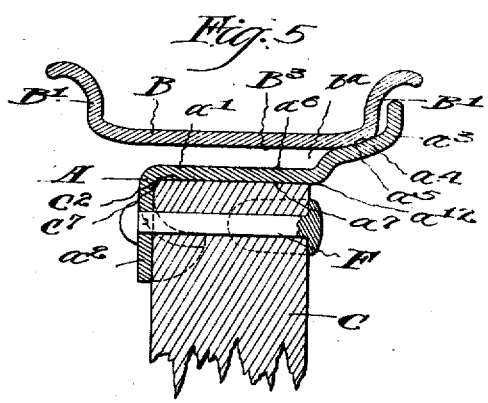
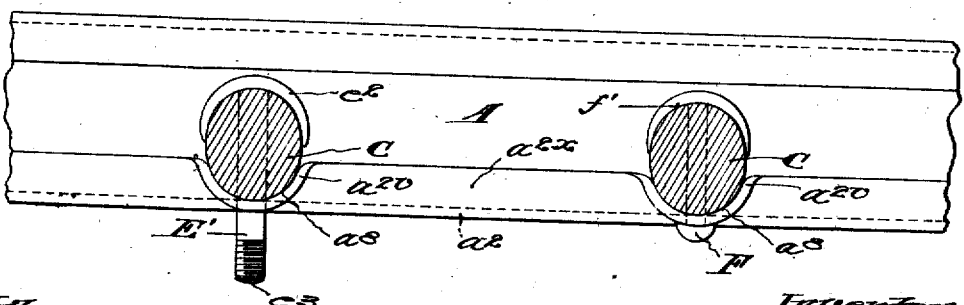
Witness:
Inventor:
Erle King Baker
by
Atty

UNITED STATES PATENT OFFICE.

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

SEMIWOOD WHEEL.

1,321,001.  Specification of Letters Patent.  Patented Nov. 4, 1919.

Application filed May 13, 1918. Serial No. 234,105.

*To all whom it may concern:*

Be it known that I, ERLE K. BAKER, a citizen of the United States, and a resident of Chicago, county of Cook, and State of Illinois, have invented new and useful Improvements in Automobile-Wheels, entitled Semiwood Wheels, of which the following is a specification.

My invention relates to improvements in automobile wheels of the kind equipped with demountable rims and pneumatic tires.

The present invention is a modification of that which is described and claimed in my companion application entitled semi-wood wheels for use with demountable rims, Serial Number 231,223, filed April 27, 1918.

The object of my invention is to simplify the construction of such wheels:—to lessen the weight, and especially the peripheral weight thereof;—and, to reduce their cost all without sacrifice of strength, durability or appearance.

I accomplish these objects chiefly through the elimination of unnecessary parts whether of wood or metal;—for, as will appear hereinafter, I dispense with the customary felly, also with the mortising and tenoning of felly and spokes, and with all felly bolts and clips; all of which I find objectionable on account of the weight which they add at the periphery of the wheel, and which represent a large part of the cost of ordinary automobile wheels.

In my invention I take advantage of a condition which is characteristically present in a pneumatic-tired automobile wheel, and which does not exist in a wheel that has a metal tire or which has a solid rubber tire. I here speak of the fact that a wheel which is encircled by an inflated pneumatic tire is therein held in a state of suspension, with the result that road shocks and blows are not directly communicated from the ground to the hub, but instead are distributed with substantial uniformity throughout the periphery of the wheel and hence to the ends of all the spokes. From this I have deduced the conclusion, borne out by experience with wire wheels, that the only real requirement of the peripheral portion and the demountable rim of an automobile wheel is that they shall be capable of holding the pneumatic tire in an inflated state and, while doing so, shall serve as a reliable connection between the base of the tire and the wooden spokes, that radiate from the hub.

In conformity with this conception, I have invented an automobile wheel for demountable rims, which is fully as strong as the wheels now in use, which is of less over-all weight, which is of a minimum peripheral weight, which may be manufactured more rapidly, and at less cost than like wooden wheels of the present type;—and wherein I retain all of the well-known advantages of wooden spokes, as compared with metal disks, or the metal spokes, which have been offered as substitutes; and incidentally, I entirely dispense with the usual heavy and expensive wood or metal felly of rectangular or box-like cross-section.

While not limited to the specific structure therein depicted, my invention will be readily understood on reference to the accompanying drawings in which: Figure 1 is a side view of an automobile wheel embodying my invention;—Fig. 2 is a section on the line X—X of Fig. 1;—Fig. 3 is an enlarged view of a portion of the wheel periphery, illustrating the spoke-end fastenings and other details;—Fig. 4 is a further enlarged section on the line W—W of Fig. 3;—Fig. 5 is a section on the line V—V of Fig. 3;—Fig. 6 is a section on the line Y—Y of Fig. 3;—and, Figs. 7, 8, 9, and 10 are like unto Fig. 5, showing four optional or modified forms of my novel combined felly and felly band whereto the spokes are secured.

As stated, my invention has to do with demountable rims for pneumatic tires and the making of wheels suitable for use therewith. Having determined that the ordinary wheel felly whether of wood or of metal is objectionable on the ground of weight and because of its initial cost and the expense of assembling it with the spokes and the metal felly band ordinarily used, I completely discard such a felly and its separate felly band or fixed rim, and substitute therefor a lighter and more efficient metal part which is in the nature of a combined felly band and felly. This part serves as the circumferential seat for the demountable rim; and at the same time serves as the part to which the spoke-ends are secured;—and, together with the spoke-ends, serves as the base upon which the rim clamping devices are secured. I construct this combined felly band and felly, in such manner that the spokes may be assembled therewith by a straight sliding motion of the ends of the spokes with respect to this circumferential portion; whereby I am enabled to use spokes of maximum length, and therewith to expand and circumferentially tension the metal part, with a degree of accuracy and tightness never before attainable in wood wheels.

In the drawings the combined felly band and felly, to which I have referred, is marked A;—the pneumatic-tire rim, with which it co-acts, is marked B;—the wheel-spokes are marked C;—the wheel hub is marked, D and its fixed hub flange $D^2$;—and the rim clamping devices (wedge lugs in this case) are marked E. The parts A, B, D and E are made of metal;—the spokes C are made of wood. The other separate parts which enter the structure of the wheel are the clamping bolts, $E^1$, and similar rivets, F. The loose flange, $D^1$, and the bolts, $D^3$, are counted as belonging to the hub. It remains only to mention the pneumatic tire, G, and its valve stem, $G^1$. From this brief description it will be plain that my novel wheel is of most simple construction. The forms and functions of the individual parts, their inter-relation, and co-action may now be considered.

It is to be understood that the straight-side pneumatic tire, G, and the straight-side metal rim, B, are merely representative of the several kinds of pneumatic tires and rims now in general use. At a glance, anyone skilled in the art will understand that my wheel is fully as well adapted for use with clencher rims and with clencher tires. Furthermore, the rim, whatever its cross-section, may be of the endless type; with or without a detachable side flange; or the rim may be of the Baker or transplit type here shown. The straight side rim, B, herein shown, has integral tire-holding flanges, $B^1$, and is of the transplit type, as indicated at $B^2$. Practically every transplit rim in present use is characterized by an inner periphery, $B^3$, which is cylindrical, and by a rim-end connector, $B^4$ on said inner periphery; and as all such rims are of the demountable type, they are also characterized by an anti-creeper or driver, $B^5$, of some kind, which projects from said inner periphery, $B^3$, for co-action with the periphery of the wheel; in this case, with the member, A. My novel wheel is made to fit all such rims, the peripheral member, A, of the wheel being formed and proportioned to permit such rims to be "buttoned" upon and "unbuttoned" from the wheel in the same manner as in the case of the metal banded wooden fellied wheels in common use.

The metal hub, D, here shown, with its spaced hub flanges, $D^1$ and $D^2$, and its hub bolts, $D^3$, represents any one of the several well-known kinds of automobile wheel hubs. The mitered or wedge-shaped butts, $C^1$, of the wooden spokes constitute the central or hub-portion of the wooden portion, or body, of the wheel, and are bound or clamped rigidly between the flanges, $D^1$ and $D^2$, of the metal hub. There may be as many as desired of these wooden spokes, C, radiating from the hub, D.

The circular peripheral member, A, is usually made by first hooping up and welding the ends of a strip of flat metal stock and then rolling the endless hoop to the cross-sectional shape, best disclosed in full-line section in Fig. 5. The peripheral member, A, then comprises the cylindrical middle section, $a^1$, the inwardly-turned or radial front flange, $a^2$, and the outwardly turned back flange, $a^3$, a portion, $a^4$, of which presents an inclined or conical circumferential seat, $a^5$, which receives the demountable rim, B. As shown, the member, A, is of substantially uniform thickness in cross-section and presents an inner periphery, $a^7$, that is circumferentially parallel to the outer periphery, $a^6$. The relation between the member, A, and the spokes, C, and the means whereby the spoke ends are secured to the member, A, will presently be described. At this point I will explain the further relation between the member, A, and the rim, B, in order that the direct co-action of those parts may be understood. The portion, $a^1$, is of less diameter and circumference than the rim, B, so that an annular space, $ba$, is provided between the inner periphery, $B^3$, of the demountable rim and the outer periphery, $a^6$, of the member, A. The width of the annular space, $ba$, is sufficient to allow the rim, B, to be swung or "buttoned" onto the wheel in the well-known manner and is wide enough to receive the points, $E^2$, of the wedge lugs, E, which latter rest upon the member, A, directly over the flange, $A^2$, and support the outer edge of the rim, B, while clamping the rim against the back flange, $A^3$. Any other form of rim-clamping lug may be used as long as it serves to clamp the rim, B, axially against the seat ($a^5$) portion of the member, A.

On approaching the outer ends of the spokes, C, a new spoke formation is encountered, also a new method of securing the spokes to the peripheral member of the wheel, to-wit, the ends of the spokes, C, are round or substantially round in cross-section, therein conforming to usual practice, but instead of being provided with the usual tenon and shoulder, the end of each spoke presents a substantially flat outer end or face, $C^2$. The flat or squared end, $C^2$, of each spoke engages the inner periphery, $A^7$, of the member, A. The method of assembling the spokes and the member, A, will be explained hereinafter.

The spoke ends are secured to the member, A, by the joint action of the front flange, $a^2$, and respective bolts or rivets, E' and F. The front flange, $a^2$, is specially shaped to this end. Thus after the member, A, is rolled to the cross-sectional shape shown by full lines in Fig. 5, the substantially right-angled front flange, $a^2$, is pressed or otherwise deformed to provide the integral half-sockets, $a^8$. These are spaced to receive respective spokes, C; that is, when the wheel is assembled the spoke ends are placed in respective half sockets, $a^8$, and are secured therein by means of respective bolts, E', and rivets, F, or the like. Preferably both the bolts and the rivets, are provided with T-heads ($e^2$ and $f^1$) which conform to the spokes and comprise complementary half-sockets which co-act with the respective integral sockets, $a^8$.

Preferably the half sockets, $a^8$, are formed by leaving perpendicular to the part, $a^1$, those portions of the flange, $a^2$, which are to be engaged by the spokes and by pressing back only the intermediate portions, $a^{2x}$, of the front flange, $a^2$. The final form of the front flange is well depicted in Figs. 3, 4, 5 and 6 from which it will be clear that the intermediate portions (parts between the spokes) convert the front flange, $a^2$, into a heavy strengthening roll or reëntrant flange, interrupted at intervals by the socket portions, $a^8$. The junction portions $a^{2y}$, are preferably formed to hug the sides of the spokes, and afford wide bearings therefor.

Obviously the roll portion, $a^{2x}$, materially stiffens the member, A, in both lateral and radial directions, and thus affords marked advantages. A chief advantage of the half sockets is that they afford a strong circumferential driving engagement between the member, A, and the spokes, which engagement is augmented by the bolts, E', and rivets, F. The construction described has further advantages;—it is of little weight, is very strong, and is cheap to make.

Figure 8:
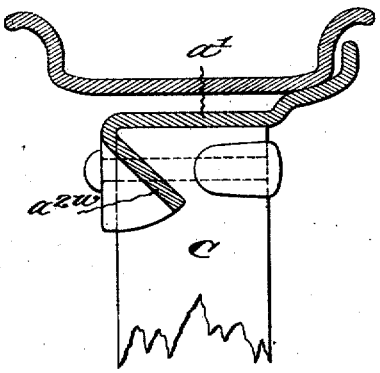
Figure 9:
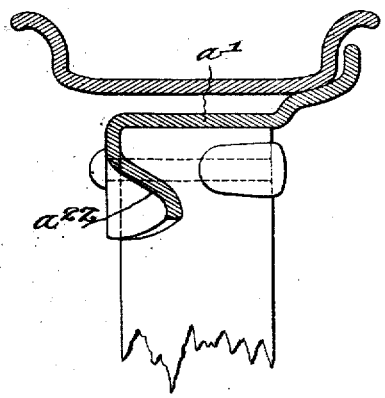

As represented in Figs. 7 to 10, inclusive, the front flange may be deformed in various ways to provide the integral half spoke sockets characteristic of this invention. Fig. 7 closely resembles Fig. 4, but the metal is formed to provide inturned portions, $a^{2y}$, which substantially parallel the cylindrical middle portion of the member, A. As shown in Fig. 8, the inwardly turned or bent portions, $a^{2w}$, are at an acute angle to the middle portion, $a^1$, of the member, A. Fig. 9 illustrates a front flange portion, $a^{2z}$ which combines the forms of Figs. 7 and 8.

Figure 10:
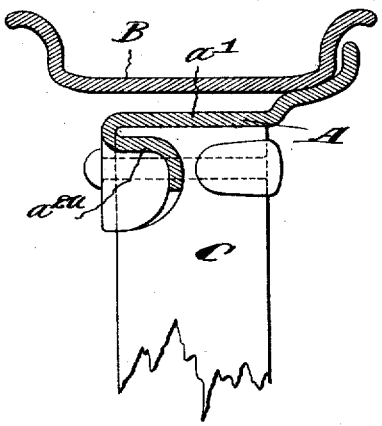

And Fig. 10 illustrates a front flange portion $a^{2u}$ which provides more extensive spoke-bearing surfaces for the spokes, the metal being sharply deformed at the edge of the middle portion, $a^1$. In this form the extreme edge portions of these intermediate parts of the front flange are left substantially perpendicular to the flat or cylindrical middle portion of the member, A.

By the described fastenings, to-wit, the integral half sockets and the removable half sockets (the latter being preferably the T-head bolts) all of the spoke ends are drawn or forced into firm engagement with the flange, $a^2$, of the member, A. The ends of the spokes are thereby accurately located or spaced with respect to the member, A;—and the splitting of the wooden spokes is positively prevented. The half sockets, $a^8$, should closely fit the spoke ends and to this end I prefer that the sockets shall be slightly smaller than the spokes which they are to receive, so that the wood may be slightly compressed or condensed when forced into them. Through their engagement with the flange, $a^2$, of the member, A, the spoke ends are accurately alined in a single plane. The tying together of the spokes and the member, A, by means of the bolts and rivets which pass through the spokes and the flange, $a^2$, brings out a new function, to-wit, the peripheral member is positively bound or tied upon the ends of the spokes and cannot become loose thereon.

For a twelve-spoke wheel, and its demountable rim, such as shown in Fig. 1, I provide six clamping lugs, E, placing them radially opposite every other spoke end. The bolts, E', belonging to these clamping lugs, pass through holes, 2, (bored in the ends of the spokes) and through holes, 3, in the socketed flange, $a^2$, of the peripheral member, A. The head, $e^2$, of each bolt, being wrapped around the spoke, prevents the bolt from turning in the spoke and the head is so extensive that it cannot objectionally bury itself in the wood. The outer end, $e^3$, of each bolt has a thread and receives the nut, $e^4$, whereby the lug, E, is clamped upon the member, A, and against the demountable rim, B. It will be noted that the socket portion of the flange, $a^2$, provides a proper bearing for the fulcrum portion, $e^5$, of its clamping lug. In each case the clamping device (comprising the lug, E, bolt E', and nut $e^4$), when in clamped condition, adds to the security and fixity of the connection between the spoke and the member, A.

The construction best illustrated in Figs. 3 and 4 is especially admirable because it places the bolts, E', close to the middle peripheral portion of the member, A, and provides secure bearings for the bolt and the clamping lug which it carries. Special attention is directed to the fact that in each case the clamping lug, when in position, constitutes a direct support or bearing between the rim, B, and the member, A, so that the inward pressure of the rim, B, acting through the member, A, is imposed directly upon the ends of those spokes C.

The parts, $a^{10}$, are rim-centering and supporting studs, pressed from or formed upon the portion, $a^1$, of the member, A. The height of these projections or studs is a few thousandths of an inch less than the height of the space, $ba$, between the rim, B, and member A. The studs serve to center the rim, B, upon the wheel during the act of mounting the rim thereon, and thereafter serve to support the rim at points intermediate the several clamping lugs, E. One of the distinct advantages which flow from the positioning of the clamping lugs, E, over the ends of their spokes is that the centering and supporting studs, $a^{10}$, likewise may be placed directly over the ends of the intermediate spokes, C. Therefore such road shocks as the studs, $a^{10}$, are called upon to receive, through the rim, B, are transmitted to the ends of their respective spokes. Thus the back flange, $a^4$, of the member, A, is relieved from excessive stresses that it might otherwise suffer. One who is skilled in the art will understand that the rim, B, is mounted upon and demounted from the described wheel in the ordinary manner, the driver, $b^5$, at such times, serving as the "buttoning on" pivot between the rim and wheel. The studs, $a^{10}$, insure the concentricity of the rim and wheel, both before and after the lugs, E, are clamped in place.

I do not follow ordinary methods in assembling or building the herein described wheel, but have devised a novel and extremely simple method for that purpose. As a first step, I more or less loosely assemble the group of spokes in their proper radial relations. Having thus completed the body of the wheel, I slide the body, as a whole, axially into the encircling member, A. The circumferential curved shoulder, $a^{12}$, of the member, A, obviously facilitates the entrance of the ends of the spokes; and the front outer corners, $C^7$, of the spokes may also be rounded, to that end. The peripheral member, A, has sufficient strength to resist material radial distortion by the spokes and hence the spokes are forced inward; with the result that the wedge-shaped or mitered ends of the spokes are set firmly together, and the member, A, is left in ideally tensioned condition. Preferably, all of the necessary holes are punched in the member, A, before the spokes are forced home into the integral sockets and the wheel is completed by the placing of the bolts, E', and the rivets, F, in the hereinbefore described positions.

From the foregoing description it will be clear that in this wheel I have attained the several objects set forth in the opening of this specification. The wheel has many advantages that may not at once be apparent but which will be appreciated by those who may make and use it. By reason of the increased length of the wooden spokes the wheel is much more resilient than the common wheel whether having a wooden or a metal felly. The member, A, is of little, if any, greater weight than the metal felly band of an ordinary wheel of the same size and obviously I have eliminated both the cost and the weight of the felly which has so long been considered an essential part of an automobile wheel. My novel wheel is much stronger than the ordinary wheel, and is of better appearance. It is easier to keep clean. It is little if at all affected by climatic changes for, as is well known, wooden spokes do not materially change their length when wetted and dried, and the contact of wood to wood is eliminated. Furthermore, the inherent resilience imparted to the peripheral member, A, in the act of pressing the spokes into place as described, insures constant and tight contact between that member and the ends of the spokes even in the absence of the assisting bolts and clips. A further advantage which may not be recognized at first sight follows the omission of the usual felly, towit: the back flange, $a^3$, of my wheel, though firmly supported upon the spoke-ends, is free at points between the spokes and therefore may yield slightly to the axial thrust of the demountable rim, B. In consequence, the rim is permitted to seat itself firmly upon the back flange throughout its circumference. This is in marked contrast to the action of the ordinary wheel in which case the rim is rarely found in contact with the back flange at points directly opposite the wedge lugs.

I believe that it will be generally admitted that in this wheel I have provided an idea complement for the now extensively used single-piece demountable rim, such as herein illustrated.

This application is specific to certain subject-matter herein presented. The basic invention is described and claimed in my copending application, Serial No. 328,682.

Having thus described my invention, I claim as new and desire to secure by Letters Patent:—

1. A semi-wood automobile wheel for use with demountable rims, comprising a wheelbody composed of a metal hub and a plurality of wooden spokes radiating therefrom, in combination with a rim-receiving wrought metal band resting upon, and having integral sockets bent to hold, the ends of said spokes, and metal devices tying said bands and spokes together in that relation.

2. A semi-wood automobile wheel for use with demountable rims, comprising a wheel-body composed of a metal hub and a plurality of wooden spokes radiating therefrom, in combination with a rim-receiving wrought metal band resting upon and having integral bent spoke sockets containing, and hence in circumferential driving engagement with, the ends of said spokes, and metal fastenings including a plurality of rim-clamping bolts located in respective spoke-ends inward of said band, whereby said band and spoke ends are tied together.

3. A semi-wood wheel for use with demountable rims, comprising a wrought metal band composed of a cross-sectionally flat cylindrical body portion, a rim seating portion and a spoke alining and felly forming flange, the latter being deformed to provide spaced half sockets to receive respective wooden spokes, in combination with a plurality of wooden spokes having their ends in respective sockets and in end abutment with the inner periphery of said flat body portion of the band, and means securing the spoke ends in respective sockets and hence against said flange, including suitable rim-clamping devices adapted for coaction with said rim seating portion of the band to secure a rim thereon.

4. A semi-wood wheel for use with demountable rims, comprising a wrought metal band composed of a substantially cylindrical body portion, a rim seating portion and a spoke alining portion, in combination with a plurality of wooden spokes having their ends in abutment with the inner side of said body portion of the band, said spoke alining portion being deformed to provide integral half sockets for the reception of respective spoke ends and suitable rim clamping devices for coaction with said rim seating portion of said band, to secure a rim thereon.

5. A semi-wood wheel for use with demountable rims, comprising a wrought metal band composed of a body portion, a rim seating portion and a spoke alining and felly forming flange, in combination with a plurality of wooden spokes having their ends in abutment with the inner side of said body portion and with said flange, and said flange being bent to provide side sockets in circumferential driving engagement with respective spoke ends.

6. A semi-wood wheel for use with demountable rims, comprising a wrought metal band composed of a body portion, rim seating portion and a spoke alining flange bent to form spoke sockets, in combination with a plurality of wooden spokes having their ends in said sockets and in abutment with the inner side of said body portion of the band, and rivets securing certain of the spoke ends against said flange.

7. A semi-wood wheel for use with demountable rims, comprising a wrought metal band composed of a body portion, a rim seating portion and a spoke alining flange deformed to provide a plurality of integral spoke sockets, in combination with a plurality of wooden spokes having their ends in respective sockets and in abutment with the inner periphery of said body portion of the band, rim clamping bolts extending through certain of said spokes and through respective socketed portions of said flange, and rivets extending through said flange and the respective remaining spokes.

8. A semi-wood wheel for use with pneumatic-tire rims, comprising a wrought metal band having a spoke alining flange, the latter being deformed to provide spoke engaging projections or shoulders upon its inner side, in combination with a plurality of wooden spokes having their end portions in circumferential driving engagement with respective projections upon said flange and means metallically securing said spokes against said flange.

9. A semi-wood wheel for use with demountable rims, comprising a wrought metal band composed of a body portion, a rim seating portion and a spoke alining flange, the latter being deformed to provide spoke engaging projections or shoulders upon its inner side, in combination with a plurality of wooden spokes having their ends in circumferential driving engagement with respective projections on said flange and metallically secured against said flange, and rim clamping devices also bearing against said flange.

10. A semi-wood wheel for use with pneumatic-tire rims, comprising a peripheral wrought metal band having a spoke alining flange, the latter being deformed to provide circumferentially spaced half sockets open toward the inner side, in combination with a plurality of wooden spokes having their ends in abutment with said band and seated within respective half sockets in the flange thereof, and means metallically securing said spokes in said sockets.

11. A semi-wood wheel for use with pneumatic-tire rims, comprising a peripheral wrought metal band having a spoke alining flange, the latter being deformed to provide circumferentially spaced half sockets open toward the inner side, in combination with a plurality of wooden spokes having their ends in abutment with said band and seated within respective half sockets in the flange thereon, and T-head fastenings that substantially complete said sockets and serve to secure the spoke ends therein.

12. A semi-wood automobile wheel for use with demountable rims, comprising a wheel body composed of a metal hub and a plurality of wooden spokes radiating therefrom, in combination with a rim-receiving wrought metal band resting upon the ends of said spokes, and thereby held in a state of tension, said band being deformed to provide integral sockets wherein respective spoke ends are positioned, and metal devices tying said band and spokes together in that relation.

13. A semi-wood wheel for use with demountable rims, comprising a wrought metal band composed of a cross-sectionally flat cylindrical body portion, a rim-seating portion and a spoke-alining flange, in combination with a plurality of wooden spokes having their ends in abutment with the inner side of said flat body portion of the band, said flange being deformed to provide as many spoke sockets as there are spokes, means securing the spoke ends in said sockets, and suitable rim-clamping devices for co-action with said rim-seating portion of the band to secure a rim thereon.

14. A semi-wood wheel for use with demountable rims, comprising a wrought metal band composed of a body portion, a rim-seating portion and a spoke-alining flange, the latter being deformed between spoke positions to provide spoke sockets, in combination with a plurality of wooden spokes having their ends in abutment with the inner side of said body portion and seated in the socket of said flange.

15. A semi-wood wheel for use with demountable rims, comprising a wrought metal band composed of a body portion, a rim-seating portion and a spoke-alining flange, the latter being deformed to provide integral half sockets, in combination with a plurality of wooden spokes having their ends in abutment with the inner side of said body portion of the band and in respective half sockets of said flange, and rim-clamping bolts extending through certain of said spokes and through socket portions of said flange.

16. A semi-wood wheel for use with demountable rims, comprising a wrought metal band composed of a body portion, a rim-seating portion and a spoke alining flange, the latter being deformed to provide spoke sockets, in combination with a plurality of wooden spokes having their ends in abutment with the inner side of said body portion of the band and positioned in the sockets of said flange, centering studs upon said body portion over the ends of the alternate spokes and rim-clamping devices positioned over the ends of remaining spokes.

17. A semi-wood automobile wheel comprising a body portion composed of radial wooden spokes, in combination with a suitably flanged wrought metal band tensioned directly upon the ends of said spokes, said band having integral portions that are deformed to provide spoke-end sockets, and metal attachments that secure the spokes in said sockets.

18. A semi-wood wheel for use with demountable rims comprising a body composed of wooden spokes, in combination with a peripheral band of wrought metal tensioned upon the ends of said spokes, said band having a rim seating portion and an inwardly turned stiffening flange, the latter being bent to provide integral half sockets wherein the ends of respective spokes are positioned, rim-clamping bolts positioned in certain of said spoke ends and metal fastenings securing the remaining spoke ends in their respective sockets.

In testimony whereof, I have hereunto set my hand this 6th day of May, 1918.

ERLE KING BAKER.